United States Patent
Yang et al.

[11] Patent Number: 6,151,089
[45] Date of Patent: Nov. 21, 2000

[54] REFLECTION TYPE DISPLAY WITH LIGHT WAVEGUIDE WITH INCLINED AND PLANAR SURFACE SECTIONS

[75] Inventors: Ying Bao Yang; Tetsuo Urabe; Yukio Kinoshita; Hideo Kataoka; Takayuki Fujioka, all of Kanagawa, Japan

[73] Assignee: Sony Corporation, Tokyo, Japan

[21] Appl. No.: 09/233,519

[22] Filed: Jan. 20, 1999

Related U.S. Application Data

[63] Continuation-in-part of application No. 09/046,765, Mar. 24, 1998.

[30] Foreign Application Priority Data

Jan. 20, 1998 [JP] Japan ................................. 10-022681

[51] Int. Cl.[7] .......................... G02F 1/1335; G01D 11/28; F21V 7/04
[52] U.S. Cl. .............................. 349/113; 349/62; 349/63; 349/65; 362/26; 362/31
[58] Field of Search ................................. 349/62, 63, 113, 349/65; 362/26, 31; 385/146, 901

[56] References Cited

U.S. PATENT DOCUMENTS

| | | | |
|---|---|---|---|
| 4,914,553 | 4/1990 | Hamada et al. | 362/32 |
| 5,050,946 | 9/1991 | Hathaway et al. | 385/33 |
| 5,341,231 | 8/1994 | Yamamoto et al. | 359/49 |
| 5,485,354 | 1/1996 | Ciupke et al. | 362/31 |
| 5,489,999 | 2/1996 | Matsumoto | 359/49 |
| 5,587,816 | 12/1996 | Gunjima et al. | 349/62 |
| 5,608,550 | 3/1997 | Epstein et al. | 359/40 |
| 5,703,667 | 12/1997 | Ochiai | 349/65 |
| 5,830,542 | 11/1998 | Shigeno et al. | 428/1 |
| 5,838,403 | 11/1998 | Jannson et al. | 349/65 |
| 5,914,760 | 6/1999 | Daiku | 349/65 |
| 5,917,565 | 6/1999 | Suzuki | 349/65 |

*Primary Examiner*—William L. Sikes
*Assistant Examiner*—Tarifur R. Chowdhury
*Attorney, Agent, or Firm*—Hill & Simpson

[57] ABSTRACT

A reflection type display device includes a panel, a light guide plate placed external to the panel, and a light source placed at the end of the light guide plate for generating illumination light as required. The light guide plate normally transmits external light onto a first substrate of the panel and emits the external light reflected from a second substrate of the panel, while, as required, guides illumination light onto the first substrate and emits the illumination light reflected from the second substrate. The light guide plate includes a planar section divided into bands and an inclined section lying between each planar section. The light guide plate reflects the illumination light guided from the light source at each inclined section so as to lead it onto the first substrate and emits the illumination light reflected from the second substrate through each planar section and inclined section. The width of the planar section is set to 15 or more times, or preferably 20 or more times, the width of the inclined section.

11 Claims, 5 Drawing Sheets

REFLECTION TYPE DISPLAY WITH LIGHT WAVEGUIDE WITH INCLINED AND PLANAR SURFACE SECTIONS

This application is a Continuation-In-Part of application Ser. No. 09/046,765, filed Mar. 24, 1998.

BACKGROUND OF THE INVENTION

1. Field of the Invention

The present invention relates to a reflection type display device which performs display by using external light such as natural light, and more specifically, it relates to an illumination structure of a reflection type display device used as an auxiliary when external light is scarce.

2. Description of the Related Art

A display device using an electro-optical material such as a liquid crystal is shaped like a flat panel and is characterized by its thinness, light weight, and low consumption of electric power. By using such characteristics, a liquid crystal display device is used for a display of a portable information apparatus or the like. Differing from an emissive device such as an LED, a liquid crystal display device (LCD) performs display by transmitting and shutting out external light in response to a voltage. Therefore, the liquid crystal display device requires an illumination structure, which is generally classified into two types, i.e., a transmission type using a backlight and a reflection type using natural light.

In a display device of the transmission type, a panel in which a liquid crystal as an electro-optical material is held between a pair of transparent substrates is fabricated, and a light source (backlight) for illumination is placed on the rear of the panel. The image is viewed from the front of the panel. A backlight is essential to the device of the transmission type, and, for example, a cold cathode fluorescent tube is used. From the viewpoint of the display device as a whole, the backlight consumes most of the electric power, which is unsuitable for displays of portable information apparatuses. On the contrary, in a display device of the reflection type, a reflector is placed on the rear of the panel, and external light such as natural light enters from the front. The image is viewed also from the front of the panel by making use of the reflected light. In contrast to the transmission type, the reflective type does not use a light source for supplying illumination light in the back, and thus the reflection type consumes relatively low electric power, which is suitable for displays of portable apparatuses. However, in the reflection type display device, the image cannot be viewed in an environment where external light is scarce, for example, at night, which remains a problem to be solved.

SUMMARY OF THE INVENTION

The present invention overcomes the difficulties noted above with respect to the related art. That is, a reflection type display device in accordance with the present invention is provided with a panel, a light guide plate, and a light source as fundamental components. The panel includes a transparent first substrate lying on the side of external incident light, a second substrate joined to the first substrate with a predetermined gap therebetween and lying on the reflection side, an electro-optical material held in the gap, and an electrode provided on at least one of the first substrate and the second substrate for applying a voltage to the electro-optical material. The light guide plate is composed of a transparent material, and is placed external to the first substrate. The light source is placed at the end of the light guide plate, and generates illumination light as required. Notably, the light guide plate normally transmits external light onto the first substrate and emits the external light reflected from the second substrate, and also, as required, guides illumination light onto the first substrate and emits the illumination light reflected from the second substrate. The light guide plate includes a planar section divided into bands and an inclined section lying between each band of the planar section. The light guide plate reflects the illumination light guided forward from the light source at each inclined section so as to guide it onto the first substrate, and emits the illumination light reflected from the second substrate through each planar section and inclined section. Also, notably, the width of the planar section is set at 15 or more times, or preferably at 20 or more times, the width of the inclined section. In one embodiment of the present invention, the thickness of the light guide plate decreases from the end where the light source lies toward the front. There is a difference in level between the adjacent planar sections, and the inclined section is provided so as to connect the difference in level. In another embodiment, the light guide plate is provided with a groove so as to isolate the adjacent planar sections, and the inclined section is formed on the groove.

In accordance with the present invention, the light guide plate is placed on the surface of the reflection type panel, and at the same time the light source is placed at the end of the light guide plate. In a dark environment, the light source is turned on and the illumination light enters into the panel through the light guide plate for displaying the image. In a bright environment, the light source is turned off and external light is directly used through the transparent light guide plate for displaying the image. The light guide plate is basically transparent, and thus it will not prevent the viewer from seeing the image even in a bright environment. As described above, in accordance with the present invention, the light source is turned on only when required, and thus the electric power consumed in the display as a whole can be greatly reduced, which is suitable for displays of portable information apparatuses. In addition to the basic function described above, in the present invention, a further device is adopted in order to enhance the image quality. That is, by setting the width of the planar section of the light guide plate to 15 or more times the width of the inclined section, or preferably, 20 or more times, the light directed toward the viewer through the inclined section from the reflection type panel can be sufficiently weakened in comparison with the light emitting from the planar section toward the viewer. Thus, double images caused by a difference in refraction of the planar section and the inclined section can be reduced. Also, the field of the present invention is not limited to the use for illuminating the panel of the reflection type panel as described above, and the present invention can be used for wider applications, such as an illumination apparatus for photographs and prints. Also, the present invention is applicable to other displays than those of display devices, such as clocks and signs, in which external light is used for displaying in the day time and illumination light from the light source is used at night.

DESCRIPTION OF THE PREFERRED EMBODIMENTS

Figure 1:
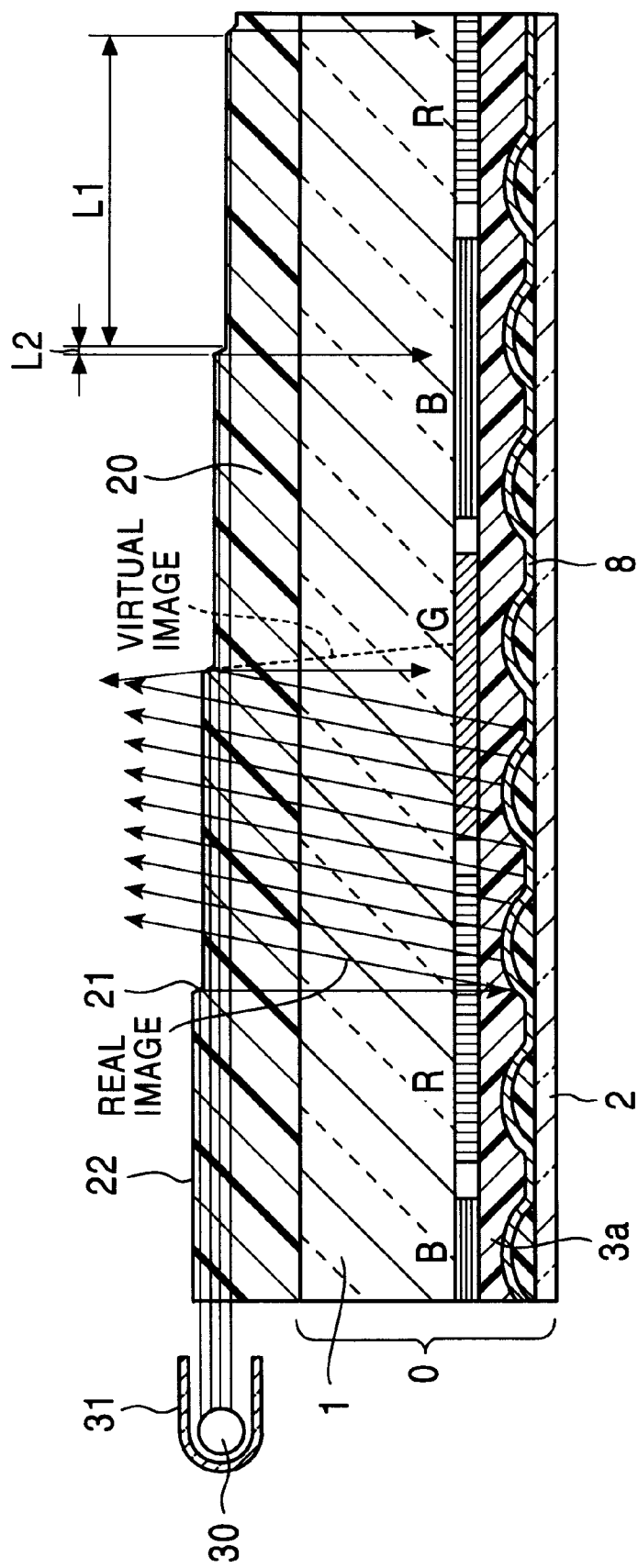
FIG. 1 is a schematic representation showing a reflection type display device in accordance with the present invention.
Figure 7:
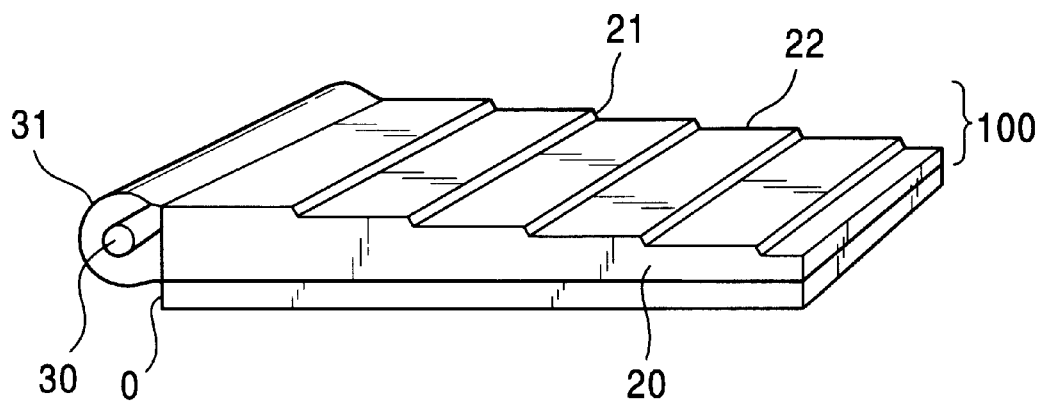
FIG. 7 is a perspective view of a reflection type display device in accordance with the present invention.

Embodiments of the present invention will be described in detail with reference to the drawings. FIG. 7 is a schematic perspective view of a reflection type display device in accordance with the present invention, which includes a panel 0 and an illumination unit 100. The illumination unit 100 includes a light guide plate 20 and a light source 30. FIG. 1 is a schematic representation showing a reflection type display device in accordance with the present invention. As shown in the drawing, the reflection type display device includes a panel 0, a light guide plate 20, and a light source 30 as fundamental components. The panel 0 includes a transparent first substrate 1 composed of, for example, glass, lying on the side of the external incident light, a second substrate 2 composed of, for example, glass, joined to the first substrate 1 with a predetermined gap therebetween and lying on the reflection side, and an electro-optical material 3a composed of, for example, a nematic liquid crystal, and an electrode (not shown in the drawing) composed of, for example, indium tin oxide (ITO), provided on at least one of the first substrate 1 and the second substrate 2 for applying a voltage to the electro-optical material 3a. Also, micro-color filters of R, G, and B are provided on the side of the first substrate 1. Additionally, a scattering type reflecting layer 8 composed of, for example, aluminum, is formed on the second substrate 2. The light guide plate 20 is placed external to the first substrate 1. The light source 30, for example, a cold cathode fluorescent tube, is placed at the end of the light guide plate 20 composed of an injection-molded piece of, for example, an acrylic resin, for generating illumination light as required. In order to improve the illumination efficiency, a reflecting mirror 31 is placed around the light source 30. The light guide plate 20, normally, transmits external light onto the panel 0 and emits the external light reflected from the panel 0, and, as required, guides illumination light onto the panel 0 and emits the illumination light reflected from the panel 0.

As shown in FIG. 7, the light guide plate 20 includes a planar section 22 divided into bands, and an inclined section 21 lying between the adjacent planar sections 22. The light guide plate 20 reflects the illumination light directed from the light source 30 at each inclined section 21 so as to guide it onto the first substrate 1, and emits the illumination light reflected from the second substrate 2 through each planar section 22 and inclined section 21. Notably, a width L1 of the planar section 22 is set at 15 or more times, or preferably at 20 or more times, a width L2 of the inclined section 21. That is, in the present invention, a width ratio between the planar section 22 and the inclined section 21 is set at 15 or more to 1, or preferably 20 or more to 1. The light entered into the panel 0 and reflected from the reflecting layer 8 reaches the viewer through the light guide plate 20. Most of the reflected light passes through the planar section 22, and only a little portion of the reflected light passes through the inclined section 21. A luminous energy ratio between the two is 15 or more to 1, or preferably 20 or more to 1, and the light passing through the inclined section 21 to be directed to the viewer can be reduced to such a degree that it is almost negligible. If no measures are taken with respect to the width ratio between the planar section 22 and the inclined section 21, a phenomenon of a double image occurs in which the pattern displayed on the panel 0 for the viewer is divided into two, i.e., a real image and a virtual image. In accordance with the present invention, this phenomenon can be effectively prevented.

When the light reflected from the reflecting layer 8 of the panel 0 is emitted toward the viewer through the light guide plate 20, the refraction received at the planar section 22 is different from that received at the inclined section 21. As shown in the drawing, the light passing through the planar section 22 forms a real image on the panel 0 from the viewer's side. On the other hand, the light passing through the inclined section 21 forms a virtual image in the direction away from the light source 30. As a result, a double image occurs on the panel 0. An intensity I of the virtual image included in the double image is expressed by the following formula:

$$I = I0 \times L2/(L1+L2)$$

where I0 is an intensity of the light entering into the light guide plate 20 from the reflecting layer 8 of the panel 0, L2 is a width of the inclined section 21, and L1 is a width of the planar section 22. As is clear from the above formula, decreasing the width of the inclined section 21 is effective at diminishing the virtual image. However, if the width of the inclined section 21 is decreased excessively, the illumination light that is totally reflected to the panel is weakened, resulting in insufficient illumination. By experimentation, it has been found that by setting L1/L2 at 15 or more, or preferably, at 20 or more, the double image can be suppressed while maintaining a sufficient illumination effect.

Table 1 shows the observations on a degree of a double image when the array pitch (L1+L2) of the light guide plate 20 is varied, with the width L2 of the inclined section 21 being fixed at 6 μm. When the array pitch of the planar section 22 and the inclined section 21 is 165 μm or more, the double image is weakened so as to be negligible. In such a case, L1/L2 is 26.5. On the other hand, when the array pitch (L1+L2) is 118 μm, L1/L2 is 18.6 and the virtual image is slightly distinguishable. Generally, with L1/L2 being 15 or more, the double image is practically suppressed, and preferably with L1/L2 being 20 or more, the double image is satisfactorily suppressed.

TABLE 1

| L1 + L2 | L1/L2 | Width of virtual image | Intensity of virtual image |
| --- | --- | --- | --- |
| 70.4 μm | 10.7 | approximately 2 mm | Strong |
| 118 μm | 18.6 | approximately 2 mm | Weak |
| 165 μm | 26.5 | approximately 2 mm | Negligible |
| 254 μm | 41.3 | approximately 2 mm | Negligible |
| 354 μm | 58.0 | approximately 2 mm | Negligible |

Figure 2:
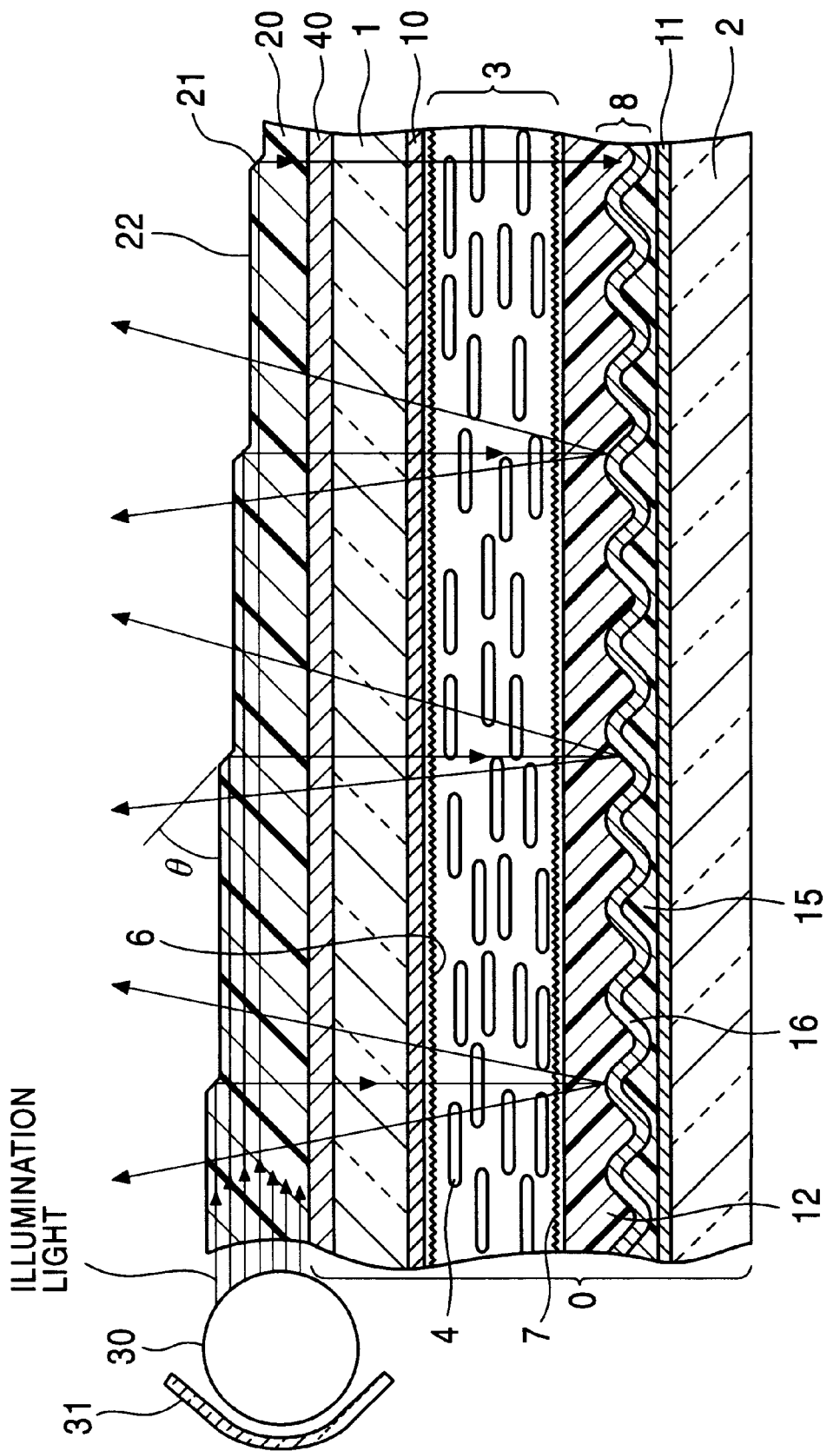
FIG. 2 is a schematic partial sectional view which shows a reflection type display device, as an embodiment of the present invention, in use in a dark environment.

FIG. 2 is a partial sectional view of a reflection type display device in accordance with the present invention when a light source 30 is turned on in a dark environment. As shown in the drawing, the reflection type display device includes a panel 0, a light guide plate 20, a light source 30, and a polarizing plate 40 as fundamental components. The panel 0 includes a transparent first substrate 1 lying on the side of the external incident light, a second substrate 2 joined to the first substrate 1 with a predetermined gap therebetween and lying on the reflection side, an electro-optical material held between both substrates 1 and 2, and electrodes 10 and 11 provided on the first substrate 1 and the second substrate 2, respectively, for applying a voltage to the electro-optical material. Depending on the driving system, at least one of the substrates 1 and 2 may be provided with an electrode. The light guide plate 20 is composed of an injection-molded piece of a transparent material, for example, an acrylic resin, and is placed external to the first substrate 1 with the polarizing plate 40 therebetween. The light source 30 is placed at the end of the light guide plate 20, and generates illumination light as required. The light source 30 is composed of, for example, a cold cathode fluorescent tube, and is a so-called "edge light". In order to improve the illumination efficiency of the edge light, a reflecting mirror 31 is provided behind the cylindrical light source 30. In such a structure, the light guide plate 20 normally transmits external light onto the first substrate 1 and emits the external light reflected from the second substrate 2, and also, as required, guides illumination light onto the first substrate 1 and emits the illumination light reflected from the second substrate 2.

The thickness of the light guide plate 20 decreases from the end where the light source 30 lies toward the front. There is a difference in level between the adjacent planar sections 22, and an inclined section 21 is provided so as to connect the difference in level. The thickness of the light guide plate 20 decreases stepwise from the end where the light source 30 lies toward the front. The light guide plate 20 totally reflects the illumination light directed forward at each inclined section 21 so as to guide it onto the first substrate 1, and emits the illumination light reflected from the second substrate 2 through each planar section 22 and inclined section 21. The inclined section 21 of the light guide plate 20 is inclined at an angle of, for example, 45° in relation to the planar section 22. In the drawing, the angle of inclination is shown as θ. FIG. 2 shows the reflection type display device in use in a dark environment, and the light source 30 constituting the edge light is turned on. The illumination light radiating from the light source 30 illuminates the panel 0 through the light guide plate 20. That is, the illumination light advancing horizontally in the light guide plate 20 is totally reflected at the inclined section 21 and enters into the first substrate 1, while the illumination light reflected from the second substrate 2 is emitted through the planar section 22 and the inclined section 21 of the light guide plate 20. Since the width of the planar section 22 is set 15 or more times, or preferably, 20 or more times the width of the inclined section 21, the luminous energy of the light emitted from the inclined section 21 is relatively small, which is at a negligible level for the viewer. Therefore, a virtual image caused by the inclined section 21 is almost inconspicuous in comparison with a real image caused by the planar section 22, and thus the double image can be suppressed.

The panel 0 uses a liquid crystal layer 3 mainly composed of nematic liquid crystal molecules 4 having positive dielectric anisotropy as an electro-optical material. However, in the present invention, the electro-optical material is not limited to a liquid crystal, and other materials may be used as the electro-optical material. Also, a guest-host liquid crystal may be used instead of the nematic liquid crystal. The panel 0 is provided with a reflecting layer 8. The reflecting layer 8 lies on the side of the second substrate 2 for scattering and reflecting external light. The liquid crystal layer 3 is homogeneously aligned by upper and lower alignment layers 6 and 7. Electrodes 10 and 11 are formed on the first substrate 1 and the second substrate 2, respectively, for applying a voltage to the liquid crystal layer 3. The liquid crystal layer 3 is horizontally aligned in the absence of an applied voltage, and functions as a quarter-wavelength plate by appropriately setting the thickness. In the presence of an applied voltage, the liquid crystal molecules 4 are perpendicularly aligned and it loses the function as a quarter-wavelength plate. In this embodiment, a display is performed by combining the liquid crystal layer 3 which functions as a quarter-wavelength plate in response to an applied voltage with the polarizing plate 40.

The reflecting layer 8 has a corrugated surface and scatters light. Accordingly, its paper-white appearance is suitable for the display background, and also, since it reflects the incident light with a relatively wide angle range, the viewing angle range is enlarged, and thus the display is easily viewed as well as the brightness of the display increasing. A transparent flattening layer 12 is provided between the reflecting layer 8 and the alignment layer 7 for compensating the corrugation. The reflecting layer 8 includes a resin layer 15 having a corrugation and a metal film 16 formed on the surface thereof, composed of, for example, aluminum. The resin layer 15 is a photosensitive resin layer on which the corrugation is patterned by means of photolithography. The photosensitive resin layer 15 is composed of, for example, a photo resist, and is applied on the entire surface of the substrate. The resin layer 15 is subjected to exposure treatment through a given mask, and is formed into, for example, a cylindrical pattern. Next, by heating to melt, the corrugation is formed stably. On the surface of the corrugation formed as described above, the metal film 16 composed of aluminum or the like having a predetermined thickness and a good reflectance is formed. If the depth of the corrugation is set at several $\mu$m, a good light scattering property is obtained and the reflecting layer 8 will have a white color. On the surface of the reflecting layer 8, the flattening layer 12 is formed to compensate the corrugation. Preferably, the flattening layer 12 is composed of a transparent organic substance such as an acrylic resin. By providing the flattening layer 12, the formation of the alignment layer 7 and rubbing treatment can be performed stably. The liquid crystal layer 3 is aligned homogeneously (horizontally) by the alignment layer 7 formed on the side of the second substrate 2 and the alignment layer 6 formed on the first substrate 1. Alternatively, the liquid crystal layer 3 may be aligned homeotropically (perpendicularly). In such a case, nematic liquid crystal molecules 4 having negative dielectric anisotropy are used. The liquid crystal molecules 4 shift from the perpendicular alignment to the horizontal alignment in response to an applied voltage.

Next, the operation for performing black-and-white display by using the reflection type display device will be described briefly. Additionally, for the color display, as shown in FIG. 1, micro-color filters of R, G, and B are provided on the first substrate 1 or the second substrate 2. In the absence of an applied voltage, the nematic liquid crystal molecules 4 are horizontally aligned, and the liquid crystal layer 3 functions as a quarter-wavelength plate. The illumination light radiating from the light source 30 is totally reflected at each inclined section 21 of the light guide plate 20 toward the polarizing plate 40. The illumination light is converted into a linearly polarized light by passing through the polarizing plate 40 and enters into the liquid crystal layer 3. The polarization axis (transmission axis) of the polarizing plate 40 is set at an angle of 45° in relation to the optic axis of the liquid crystal layer 3. Therefore, the linearly polarized light is converted into a circularly polarized light by passing through the liquid crystal layer 3. The circularly polarized light is reflected by the reflecting layer 8 and passes through the liquid crystal layer 3 in the reverse direction. As a result, the reflected circularly polarized light is converted into a linearly polarized light. However, the polarization axis of the reflected linearly polarized light is rotated by 90° from the incident linearly polarized light. Therefore, the reflected linearly polarized light cannot pass through the polarizing plate 40, resulting in a black display. On the other hand, in the presence of an applied voltage, the nematic liquid crystal molecules 4 are perpendicularly aligned in the direction of an electric field, and the liquid crystal layer 3 loses the function as a quarter-wavelength plate. Therefore, the incident linearly polarized light passing through the polarizing plate 40 is reflected by the reflecting layer 8 without being substantially affected by the liquid crystal layer 3, and returns to the polarizing plate 40 as the outgoing linearly polarized light to pass through, and thus a white display is obtained. That is, in this embodiment, the black-and-white display mode can be changed by switching on and off an applied voltage.

Figure 3:
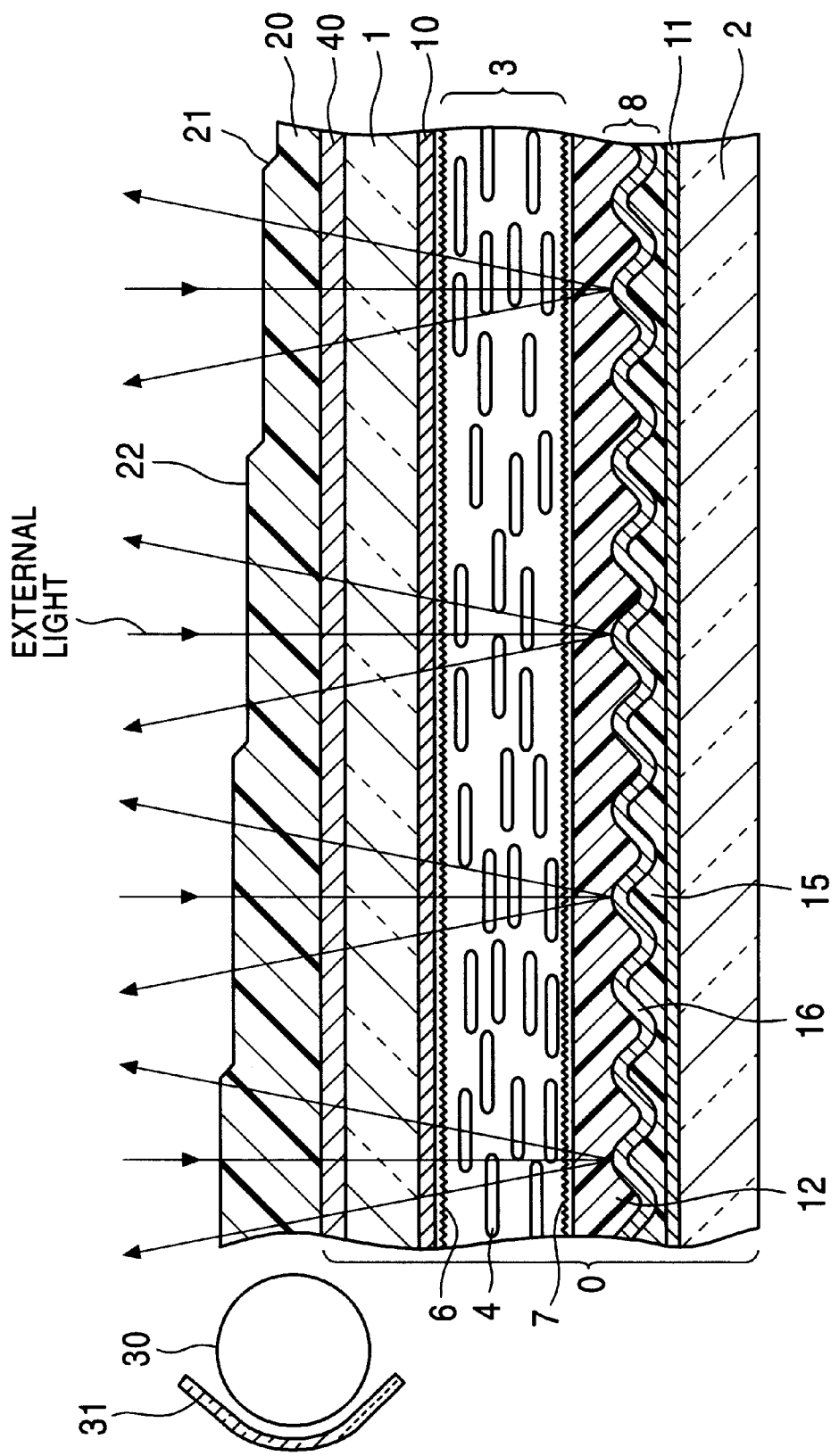
FIG. 3 is a schematic partial sectional view which shows the reflection type display device in use in a bright environment.

FIG. 3 shows the reflection type display device shown in FIG. 2 in use in a bright environment. In a bright environment, because of an ample supply of external light such as natural light, the display is performed by making use of it. Therefore, the light source 30 is turned off. Thus, the electric power consumed by the display device as a whole can be reduced. The light guide plate 20 transmits the external light entering from the side of the viewer onto the first substrate 1, and emits the external light reflected from the second substrate 2 through the planar section 22 and the inclined section 21. Since the width of the planar section 22 is 15 or more times, or preferably 20 or more times, as large as the width of the inclined section 21, the light guide plate 20 does not hinder the viewer from seeing the display.

Figure 4:
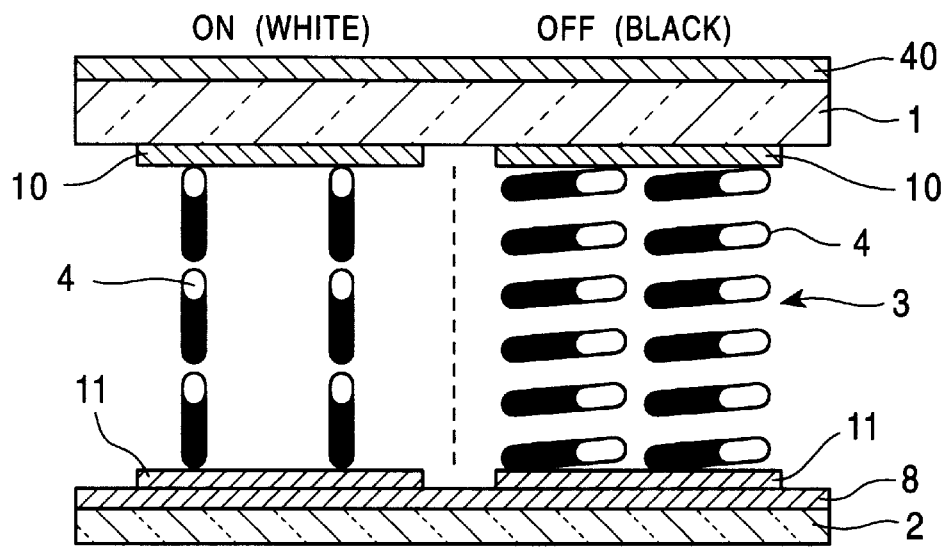
FIG. 4 is a schematic diagram which illustrates the function of the reflection type display device shown in FIGS. 2 and 3.

FIG. 4 is a schematic diagram which illustrates the on-and-off mode of the reflection type display device shown in FIGS. 2 and 3. The left shows the ON state in which a white display is obtained. The right shows the OFF state in which a black display is obtained. As described above, in the reflection type display device, the polarizing plate 40, the first substrate 1, the electrode 10, the liquid crystal layer 3, the electrode 11, the reflecting layer 8, and the second substrate 2 are deposited in that order from the top. In the OFF state, the nematic liquid crystal molecules 4 are horizontally aligned, and the liquid crystal layer 3 functions as a quarter-wavelength plate. In the ON state, the liquid crystal molecules 4 changes from the horizontal alignment to a perpendicular alignment, and the liquid crystal layer 3 loses the function as a quarter-wavelength plate. In the OFF state, the linearly polarized light passing through the polarizing plate 40 is converted into circularly polarized light by the liquid crystal layer 3, and is reflected by the reflecting layer 8. The reflected circularly polarized light is converted into an outgoing linearly polarized light by the liquid crystal layer 3. Since the polarization axis of the incident polarized light is orthogonal to that of the outgoing linearly polarized light, the outgoing linearly polarized light is absorbed by the polarizing plate 40, resulting in a black display. On the contrary, in the ON state, since the liquid crystal layer 3 does not function as a quarter-wavelength plate, the incident linearly polarized light passing through the polarizing plate 40 is not affected by the liquid crystal layer 3, and passes though the polarizing plate 40 as an outgoing linearly polarized light, resulting in a white display. In such a display mode, generally, the contrast ratio between the white display and the black display is 15 or less. Accordingly, by setting the above-mentioned intensity ratio between the real image and the virtual image caused by the difference in refraction in the light guide plate so as to exceed the contrast ratio, the virtual image is substantially almost inconspicuous. That is, in the present invention, the relative ratio between the width of the planar section and that of the inclined section is set at 15 or more such that the ratio between the quantity of the illumination light emitting from the planar section of the light guide plate and the quantity of the illumination light emitting from the inclined section exceeds the contrast ratio of 15 of the panel.

Figure 5:
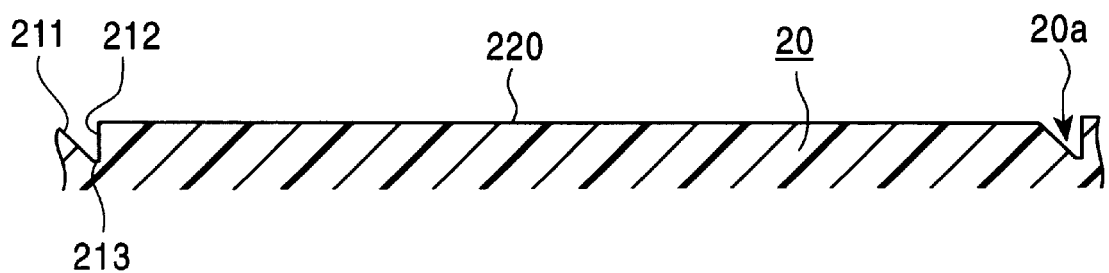
FIG. 5 is a sectional view of a light guide plate in a reflection type display device as another embodiment of the present invention.

FIG. 5 is a partial sectional view of a light guide plate in a reflection type display device as another embodiment of the present invention. In this embodiment, a groove 20a is provided so as to isolate the adjacent planar sections 220, and an inclined section 211 is formed on the groove 20a. On the groove 20a, a vertical section 212 is also formed so as to face the inclined section 211. The inclined section 211 and the vertical section 212 are connected to each other by a bottom 213. In this embodiment, the width of the planar section 220 is set, for example, at 201 $\mu$m, the width of the inclined section is set, for example, at 6 $\mu$m, and the angle of inclination is set, for example, at 58°. Furthermore, the height of the vertical section 212 is set, for example, at 8.2 $\mu$m, and the width of the bottom 213 is set, for example, at 2 $\mu$m.

Figure 6:
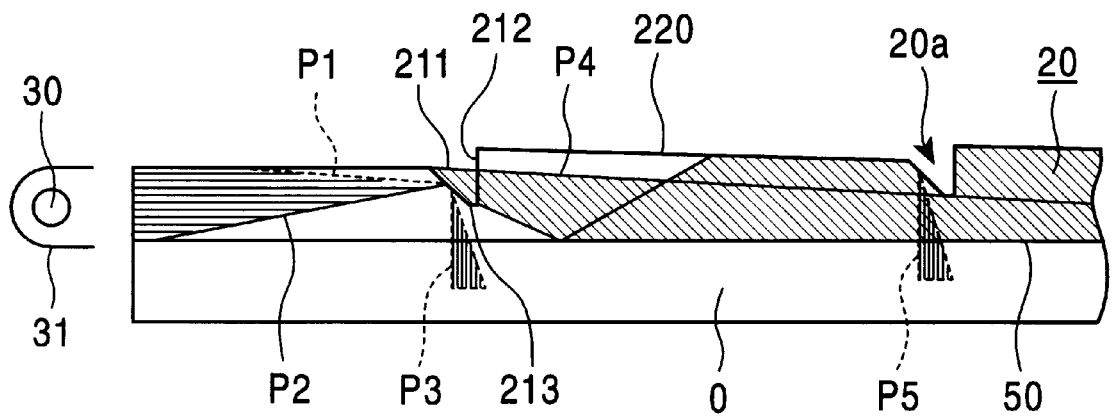
FIG. 6 is a schematic diagram which illustrates the usage and the function of the light guide plate shown in FIG. 5.

FIG. 6 is a schematic diagram which illustrates the usage and the function of the light guide plate 20 shown in FIG. 5. The light guide plate 20 is joined to the panel 0 with an intervening layer 50 therebetween. A light source 30 is placed at the end of the light guide plate 20. The light source 30 is partially covered with a reflecting mirror 31. As described above, the light guide plate 20 includes the planar section 220 divided into bands and the groove 20a lying between the planar sections. The planar section 220 constitutes a light-emitting plane, and the groove 20a has the inclined section 211, the vertical section 212, and the bottom 213. The inclined section 211 totally reflects a portion of illumination light guided from the light source 30 onto the panel 0. In the drawing, among the illumination light having different angles of incidence, P1 is totally reflected by the inclined section 211 and enters into the panel 0 as illumination light P3. The vertical section 212 reenters illumination light P2 passing through the inclined section 211, which is the rest of the illumination light, into the light guide plate 20. In the drawing, the reentered illumination light is represented as P4. The planar section 220 emits the illumination light reflected from the panel 0. The angle of inclination of the planar section 220 in relation to the panel 0 is set small so that the display appearance viewed from the front of the panel 0 is not substantially changed. For example, the angle of inclination is approximately 20°. The inclined section 211 totally reflects the illumination light P1 guided from the light source 30, and also, the angle of inclination is set so that most of the illumination light reflected from the panel 0 can be totally reflected on the side of the light source 30. For example, the angle of inclination is 58°. Thus, the utilization efficiency of the illumination light can be improved, and the intensity of light passing through the inclined section 211 toward the viewer can be suppressed, enabling further reduction of the double image. The angle of inclination of the vertical section 212 is larger than that of the opposing inclined section 211, and the reentered illumination light P4 passing through the inclined section 211 can be totally reflected within the light guide plate 20. The light guide plate 20 and the panel 0 are joined to each other with the intervening layer 50 therebetween, and by appropriately setting the refractive index of the intervening layer 50, the total reflection of the illumination light P4 at the interface between the light guide plate 20 and the panel 0 is achieved. Thus, the illumination light radiating from the light source 30 can be guided to a greater distance, resulting in uniform illumination.

As described above, in accordance with the present invention, a light guide plate is placed on a reflection type panel, and a light source used as an auxiliary is placed at the end of the light guide plate. The light guide plate normally transmits external light onto the panel and emits the light reflected from the panel, and also, as required, guides illumination light onto the panel and emits the illumination light reflected from the panel. In a dark environment, the image can be viewed even in the reflection type panel by turning on the light source. On the other hand, in a bright environment where an ample supply of external light is available, the electric power is saved by turning off the light source. The light guide plate includes a planar section divided into bands and an inclined section lying between each band of the planar section. The light guide plate reflects the illumination light guided from the light source at each inclined section so as to guide it onto the first substrate, and emits the illumination light reflected from the second substrate through each planar section and inclined section. The width of the planar section is set at 15 or more times, or preferably at 20 or more times, the width of the inclined section. By suppressing the intensity of light passing through the inclined section of the light guide plate to the viewer, a double image can be eliminated.

What is claimed is:

1. A reflection type display device, comprising:

first and second substrate positioned in spaced apart relationship with a gap therebetween, the first substrate being transparent and positioned on a light incident side via which external light is introduced into the gap, the second substrate positioned on a light reflective side at which light is reflected back out of the gap;

an electro-optical material held within the gap;

an electrode provided on at least one of the first substrate and the second substrate, the electrode configured for effectively applying a voltage to the electro-optical material;

a light source;

a transparent light guide provided adjacent the first substrate but outside of the gap, the light guide plate having an upper surface facing away from the gap and comprising alternating planar sections and inclined sections, the planar sections having upper surfaces parallel to the gap, the inclined surfaces being inclined relative to the gap, the light source being provided at an end of the light guide plate, the light guide plate allowing external light to be transmitted therethrough and into the gap light reflected back from the gap to be transmitted therethrough, the inclined sections effective to reflect light from the light source and to direct the reflected light into the gap substantially at a right angle relative to the planar surface sections, the width of a planer section being at least 15 times the width of an inclined section.

2. A reflection type display device according to claim 1, wherein the width of a planar section is set to 20 or more times the width of an inclined section.

3. A reflection type display device according to claim 1, wherein the thickness of said light guide plate decreases discretely from the side of said light source to form a difference in level between adjacent planar sections, and inclined sections are provided to connect the difference in level.

4. A reflection type display device according to claim 1, wherein said light guide plate is provided with a groove to isolate adjacent planar sections, and an inclined section is formed on said groove.

5. An illumination apparatus comprising:

a transparent light guide plate placed external to an object to be illuminated; and a light source place at an end of the light guide plate for generating illumination light;

wherein, the light guide plate normally transmits external light therethrough and onto the object and emits external light reflected from the object, while the light guide plate, as required, guides illumination light onto the object and emits illumination light reflected from the object;

the light guide plate comprises a surface facing away from the objecting having alternating planar sections and inclined sections;

the light guide plate reflects the illumination light guided from the light source at each inclined section so as to lead it onto the object and emits the illumination reflected from the object through each planar section and inclined section, each inclined section directing illumination light onto the object substantially at a right angle relative to the planar sections; and the width of a planar section is 15 or more times the width of an inclined section.

6. An illumination apparatus according to claim 5, wherein the width of a planar section is 20 or more times the width of an inclined section.

7. An illumination apparatus according to claim 5, wherein the thickness of said light guide plate decreases discretely from the side of said light source to form a difference in level between adjacent planar sections, and inclined sections are provided to connect the difference in level.

8. An illumination apparatus according to claim 5, wherein said light guide plate is provided with a groove to isolate adjacent planar sections, and an inclined section is formed on said groove.

9. A reflection type display device, comprising:

first and second substrate positioned in spaced apart relationship with a gap therebetween, the first substrate being transparent and positioned on a light incident side via which external light is introduced into the gap, the second substrate positioned on a light reflective side at which light is reflected back out of the gap;

an electro-optical material held within the gap;

an electrode provided on at least one of the first substrate and the second substrate, the electrode configured for effectively applying a voltage to the electro-optical material;

an illumination light source;

a transparent light guide provided adjacent the first substrate but outside of the gap, the light guide plate having an upper surface facing away from the gap and comprising alternating planar sections and inclined sections, the planar sections having upper surfaces parallel to the gap, the inclined surfaces being inclined relative to the gap, the light source being provided at an end of the light guide plate, the light guide plate allowing external light to be transmitted therethrough and into the gap light reflected back from the gap to be transmitted therethrough, the inclined sections effective to reflect illumination light from the light source and to direct the reflected illumination light into the gap substantially at a right angle relative to the planar surface sections, the ratio between the width of a planar section and the width of an inclined section is such that the amount of illumination light reflected back from the gap and emitted from planar section relative to the amount of illumination light reflected back from the gap and emitted from the inclined section exceeds the ratio.

10. A reflection type display device according to claim 9, wherein the thickness of said light guide plate decreases discretely from the side of said light source to form a difference in level between adjacent planar sections, and inclined sections are provided to connect the difference in level.

11. A reflection type display device according to claim 9, wherein said light guide plate is provided with a groove to isolate adjacent planar sections, and an inclined section is formed on said groove.

* * * * *